United States Patent [19] [11] 4,100,527
Tocquet [45] Jul. 11, 1978

[54] MULTI-DRIVER PIEZOELECTRIC TRANSDUCERS WITH SINGLE COUNTER-MASSES, AND SONAR ANTENNAS MADE THEREFROM

[75] Inventor: Bernard Tocquet, Sanary, France

[73] Assignee: Etat Francais, Paris, France

[21] Appl. No.: 661,043

[22] Filed: Feb. 24, 1976

[30] Foreign Application Priority Data

Feb. 27, 1975 [FR] France ................................ 75 06079

[51] Int. Cl.[2] .............................................. H04B 13/00

[52] U.S. Cl. ...................................... 340/10; 310/337; 340/9

[58] Field of Search ...................................... 340/8-14; 310/8.4, 8.7, 26, 337

[56] References Cited

U.S. PATENT DOCUMENTS

| | | | |
|---|---|---|---|
| 2,190,666 | 2/1940 | Kallmeyer | 310/26 |
| 2,405,605 | 8/1946 | Goodale, Jr. et al. | 340/9 X |
| 2,515,154 | 7/1950 | Lanphier | 340/9 X |
| 2,880,333 | 3/1959 | Dranetz | 310/8.4 X |
| 3,243,767 | 3/1966 | Kendig et al. | 340/9 |
| 3,539,980 | 11/1970 | Massa | 340/8 LF |
| 3,731,267 | 5/1973 | Tocquet et al. | 340/9 |
| 3,803,546 | 12/1966 | Leon | 310/8.4 |
| 3,972,018 | 8/1972 | Erickson | 340/8 LF |

*Primary Examiner*—Harold Tudor
*Attorney, Agent, or Firm*—Haseltine, Lake & Waters

[57] ABSTRACT

A piezoelectric transducer adapted to be immersed in water at great depths, and suitable for applications as a sonar antenna, comprising a cylindrical envelope, a number of piezoelectric drivers disposed within the envelope and constituted by at least one stack of elements alternating with electrodes, at least one prestressing rod for interconnecting and compressing the stack, and a common intermediate member to which the drivers are secured by the rod, the member also acting as a counter-mass for the drivers.

7 Claims, 5 Drawing Figures

MULTI-DRIVER PIEZOELECTRIC TRANSDUCERS WITH SINGLE COUNTER-MASSES, AND SONAR ANTENNAS MADE THEREFROM

FIELD OF THE INVENTION

The present invention relates to a multi-driver piezoelectric transducer which has a single counter-mass, and to a sonar antenna made therefrom.

The invention particularly relates to piezoelectric transducers used in submarine acoustics to construct sonar antennas.

BACKGROUND

Such antennas, particularly omnidirectional transmitting antennas that are to be embedded or lowered, if they should have a substantial power, they are all the heavier and bulkier, the lower their emitting frequency.

To lighten the construction of such antennas, there are known omnidirectional piezoelectric transducers that are constituted by cylindrical envelopes having at their interiors regularly and evenly distributed radial piezoelectric drivers without any mechanical connection among themselves except the envelopes. One knows that such transducers present two principal resonant frequencies of which one is less than to the inherent or fundamental frequency of the envelope, which arrangement allows one to obtain lower frequencies for the same weight and space requirement.

SUMMARY OF THE INVENTION

It is one of the major objects of the present invention to perfect such piezoelectric transducers so as to obtain a pass-band that is wider when the resonant frequency is lower, or reduced weight and space values as compared to known earlier solutions.

The piezoelectric transducer according to the invention has, in a manner known per se, a cylindrical envelope that is rigid with respect to the inner wall, and in which there are radially disposed piezoelectric drivers, each consisting of a stack of piezoelectric elements alternating with electrodes and compressed by a prestressing or tightening rod.

The word "cylindrical" is used in a general sense without limiting any part of the invention to strictly circular sections or surfaces.

According to major features of the invention, each driver is fixed by the aid of the pre-stressing rod on the same central member that also serves as the common counter-mass for all drivers. The cylindrical envelope constitutes a band or hoop that keeps the drivers under compression.

A sonar antenna according to the invention includes several coaxially juxtaposed transducers. In a preferred embodiment, the central member is common to all transducers. The output envelope can also be made in the form of a band common to all transducers.

A transducer according to the present invention, meant to be immersed at a great depth, has a band formed by the cylindrical envelope that is closed in a watertight manner by two lateral covers, and this band is preferably filled with a dielectric liquid which is maintained in pressure equilibrium with the ambient medium.

It should be noted that in such transducers the external envelopes serve as common enclusures for all elemental drivers, that is they serve as vibrating surfaces that ensure the transmission of acoustic waves between the drivers and the water into which the transducers are immersed.

It is recommended that the transducers according to the present invention be realized without fixing each elemental driver to the external envelope, so as to avoid fixing holes to be drilled in the envelope with a high precision. The external envelope is assembled with the drivers merely by glueing and by the banding effect, having the advantage that the drivers are pre-compressed, without any flexural or torsional constraint, also permitting one to make the pre-stressing rods much lighter.

At the same time, it is important that the connection between the envelope and each driver be made with a perfect contact surface so as to obtain satisfactory transmission of the acoustic pressures.

This is attained by means of a manufacturing process according to which one first assembles each piezoelectric driver on a central member by threading on a prerestraining rod of each driver into the central member, then one compresses to an identical degree the stack of each piezoelectric driver between the central member and an end piece, placed at the other end of the stack, by applying a tensioning screw on the central rod, placed in a hollow area of the end piece. It is now important to machine the external faces of the stops and of the tensioning screws with high precision so as to obtain a satisfactorily smooth external cylindrical surface, whereupon that surface is covered by applying thereto the cylindrical envelope which, in the cold condition, has an internal diameter slightly smaller than that of the external surface, the envelope being previously heated up, so that the piezoelectric drivers are compressed by the envelope after it has cooled down.

This manufacturing process has the advantage that each pre-stressing rod is separately tensioned, which allows each tension to be regulated with high precision, so that each driver obtains substantially the same resonant frequency.

In accordance with the invention, a novel piezoelectric transducer is obtained which has an external cylindrical envelope and piezoelectric drivers that are radially disposed at the inside of the envelope, which latter serves as a common enclosure or restraint for all drivers.

In known transducers of this kind, each piezoelectric driver has a counter-mass at the inner extremity, these masses having preferably a truncated form so that there is no contact point between them.

In contradistinction to these known transducers, the transducers according to the invention allow one to obtain a gain in weight and in space. As a matter of fact, the individual counter-masses are replaced by a single central member, common to all transducers, and the measurements thereof can be much smaller than those of a single individual counter-mass for the known transducers.

Comparative tests made with this kind of known transducer have shown that, when the dimensions of the cylindrical envelope and of the piezoelectric drivers are identical, the resonant frequency of a transducer according to the present invention is reduced by about 1.5 kHz as compared to the high frequency of the known transducer. In the event of identical frequencies, the transducer according to the invention has considerably reduced measurements.

The same comparative tests have shown that the passband of a transducer according to the invention is considerably widened.

Finally, the response per watt of a transducer according to the invention, that is the relationship between the emitted acoustic pressure and the number of watts that are furnished to the transducer in the form of electrical energy, is clearly improved in comparison to the known transducers.

The transducers according to the invention include a common central member which has the inconvenience, in comparison to known transducers of this type, that, when they are immersed at a great depth, the cylindrical envelope, compressed by the hydrostatic pressure, transmits to the piezoelectric elements a unidirectional pressure following their axes of polarization which involves the danger of varying the electro-acoustic properties.

This inconvenience is remedied, in accordance with the invention, by filling the envelope with a dielectric liquid, for example oil, and by maintaining the same at a uniform pressure with the exterior, for example by means of bellows and a deformable recipient or container which is in direct contact with the surrounding water.

BRIEF DESCRIPTION OF THE DRAWING

In the following, preferred exemplary embodiments of the invention will be described with reference to the accompanying drawings, forming a constituent part of the disclosure, and wherein.

DETAILED DESCRIPTION

Figure 1:
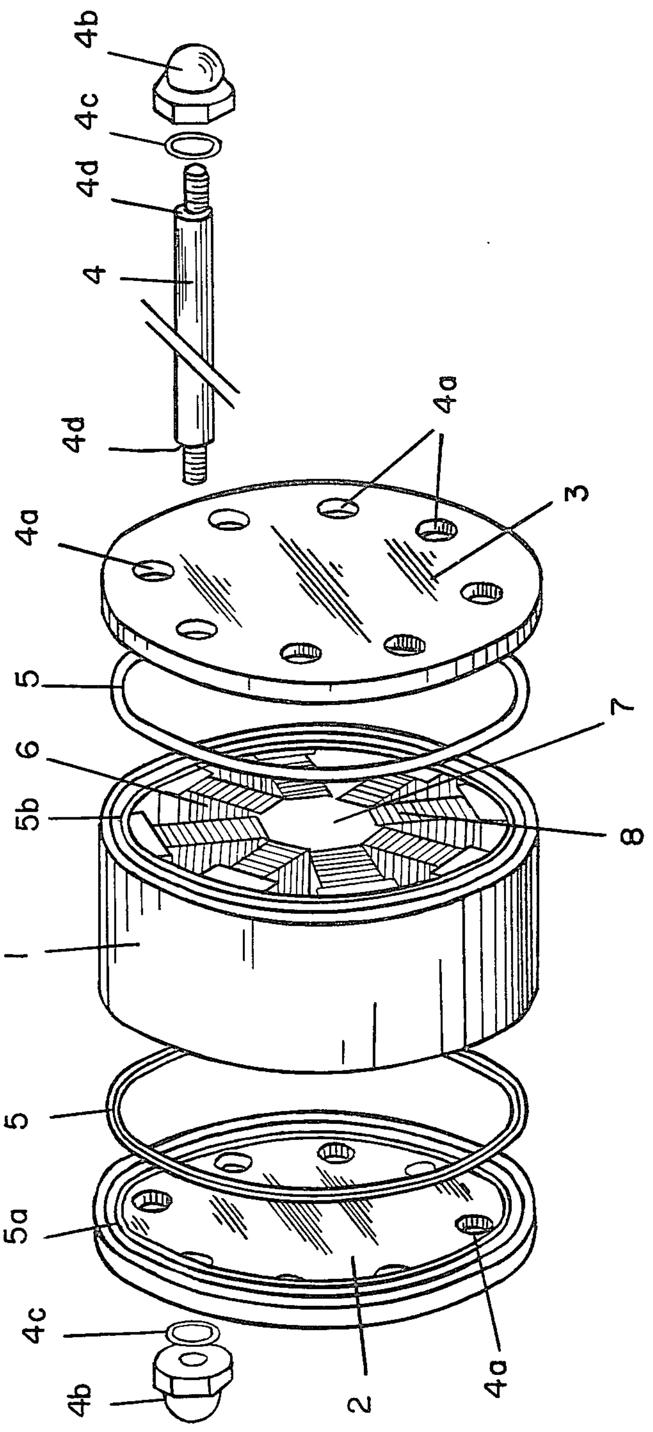
FIG. 1 is an exploded perspective view of a transducer according to the invention.

FIG. 1 shows a transducer according to the invention that comprises an external envelope 1 in the form of a cylindrical ring which has an axis X, the envelope being closed by two lateral covers 2, 3 which are kept in an assembled condition by several threaded rods 4 that pass through the envelope at spaced-apart locations.

The rods 4, of which there may be eight, as a matter of example, pass through orifices **4*a* provided in the covers 2, 3 and are tensioned by cap screws 4*b*. Sealing joints or washers 4*c* can be placed between the screws 4*b* and the covers 2, 3. The rods 4 have shoulders 4*d* on which the covers rest, the separation between the shoulders being such that the covers 2, 3 cannot touch the envelope 1**.

Annular or toric joints 5 are interposed between the covers and the envelope. They are preferably lodged in half grooves **5*a*, 5*b* provided in the covers 2, 3 and in the flanks of the enevelope 1**, respectively. These joints serve for acoustically uncoupling the covers from the envelope. They can also serve as sealing joints between these elements.

Figure 3:
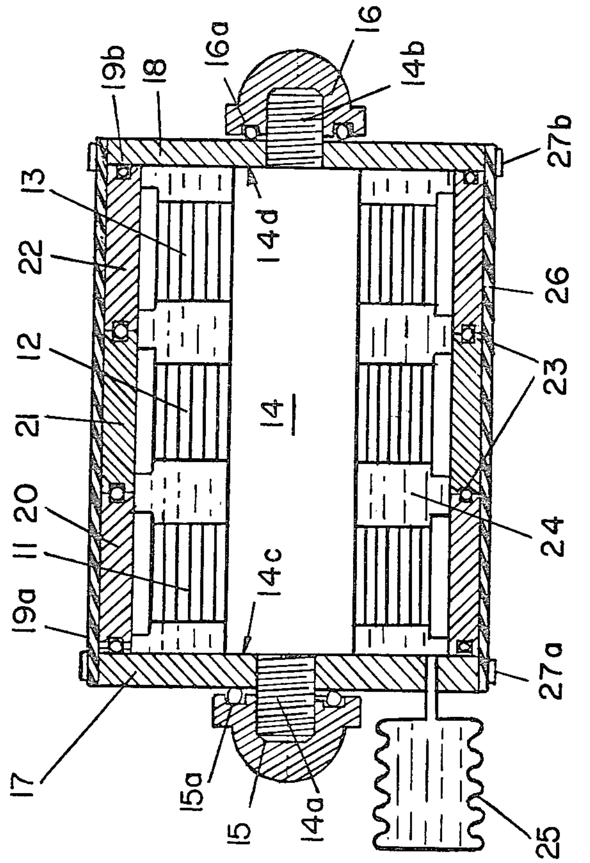
FIG. 3 is a longitudinal sectional view of a sonar antenna incorporating transducers according to the present invention.

As a variant, sealing can also be realized by means of a soft envelope, for example one made of soft rubber, commerically known in France under the designation "P.C.", which has the same density as water and in which the propagation speed of sound is the same as in water, so that this soft envelope is entirely transparent to acoustic waves. Such a modification is shown in FIG. 3, to be discussed later in more detail.

Figure 2:
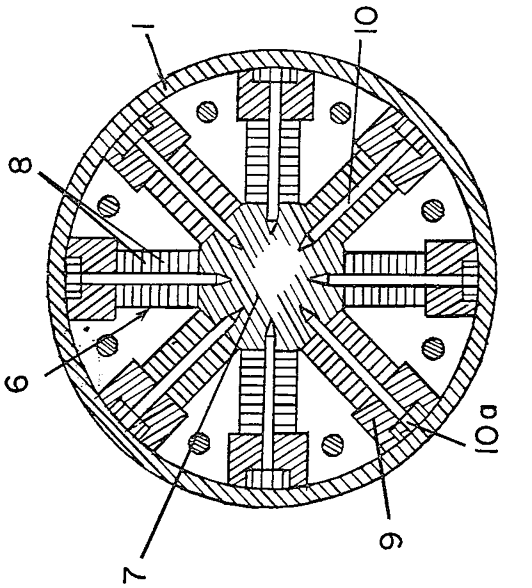
FIG. 2 is a transverse section of the transducer shown in FIG. 1.

Inside the envelope 1 there are piezoelectric drivers or motors 6. As a matter of example, eight such drivers can be provided, radially disposed and fixed to a common central member 7. In FIG. 2, constituting a transverse section, the envelope 1, the central member 7 and the eight piezoelectric drivers 6 can be seen.

Each driver is constituted, in a known manner, by a stack of piezoelectric elements 8, for example ceramic piezoelectric members that alternate with electrodes, connected to electrical conductors of alternating polarities, that connect them to known electronic exciter circuits.

The stack of piezoelectric elements is maintained in an assembled and compressed condition between the central member 7 and stop or end members 9 (see FIG. 2), placed at the outer extremities, by central rods 10 which are all threaded into the member 7 and are tensioned by screws **10*a* that are applied to the outer extremities of the rods 10. As shown in FIG. 2, the screws 10*a* can be disposed in hollow portions of the stops 9**.

To make a transducer according to FIGS. 1 and 2, first one attaches each of the drivers 6 onto the central member 7 by securing the pre-stressing rods 10 into threaded bores of the member 7.

Hereafter one tensions, separately, the pre-stressing rods 10 in that the screws **10*a* are applied, and this tension is regulated so that all drivers 6 vibrate essentially at the same inherent or fundamental frequency. Hereafter the external faces of the stops 9 are precision machined to the order of 0.01 mm, and also the screws 10*a*, to obtain a uniform cylindrical external surface with the center at 0, having a diamter which is only slightly larger than the inner diameter of the envelope 1**, the latter also having been precision machined.

Hereafter one heats the envelope 1 to expand the same, and it can then be engaged about and applied to the external surface. When the envelope cools, it forms a hoop or band that covers the stops 9 and the heads of the screws **10*a***, thereby axially compressing the piezoelectric elements.

In this manner, the envelope 1 participates in the pre-stressing of the piezoelectric elements, which allows one to use rods 10 having a thinner section.

This manner of assembling the envelope as a band, possibly reinforced by glueing, allows a good contact to be obtained between the envelope and the piezoelectric drivers, good transmission of the acoustic waves, and perfect symmetry of the pre-stressing exerted by the envelope, which does not apply to the piezoelectric drivers any flexural or torsional stress. It is not necessary individually to attach the drivers to the envelope, which would require machining with very high precision.

FIG. 3 represents a high-power transmitting antenna that is constituted by several juxtaposed transducers 11, 12, 13. These are similar to that of FIG. 1 and have the same axis X. The novelty of this antenna resides in that a central member 14 is common to the three transducers. It includes two threaded extremities or ends **14*a*, 14*b* onto which are applied screws 15, 16 that rest on covers 17, 18 after having interposed sealing joints 15a, 16a that may rest in respective grooves. The covers 17, 18 abut against shoulders 14c, 14d** to avoid direct contact with the vibrating envelopes.

The central member 14 consequently functions both as a counter-mass and as a holding bar that keeps the covers 17, 18 assembled with the three transducers. It will be understood by those skilled in the art that each of these transducers 11, 12 and 13 is preferably made in the form shown in FIGS. 1 and 2.

Each transducer has an individual annular envelope 20, 21, 22. These envelopes, having the same diameter, are juxtaposed with acoustic uncoupling joints 23 that are preferably interposed in appropriate grooves, as shown. Similarly, acoustic uncoupling joints 19a, 19b can be interposed between the envelopes 20, 22 and the covers 17, 18. The shoulders 14c, 14d prevent these joints from being excessively crushed when the screws 15, 16 are tightened, which could detract from the acoustic uncoupling. The joints 19a, 19b and 23 can also serve as sealing joints.

To realize a watertight sealing, one preferably uses another solution that is shown in FIG. 3, which could also be supplied to a single transducer as was shown in FIG. 1. The antenna is placed in the interior of a soft envelope 26 which performs the role of a skin, and surrounds the rigid envelopes 20, 21, 22 and the peripheries of the covers 17, 18. The skin is held by collars 27a, 27b that are tightened about the two extremities. The skin is preferably made of a soft material which is perfectly transparent to acoustic waves, for example the earlier-mentioned "P.C." rubber.

Figure 3A:
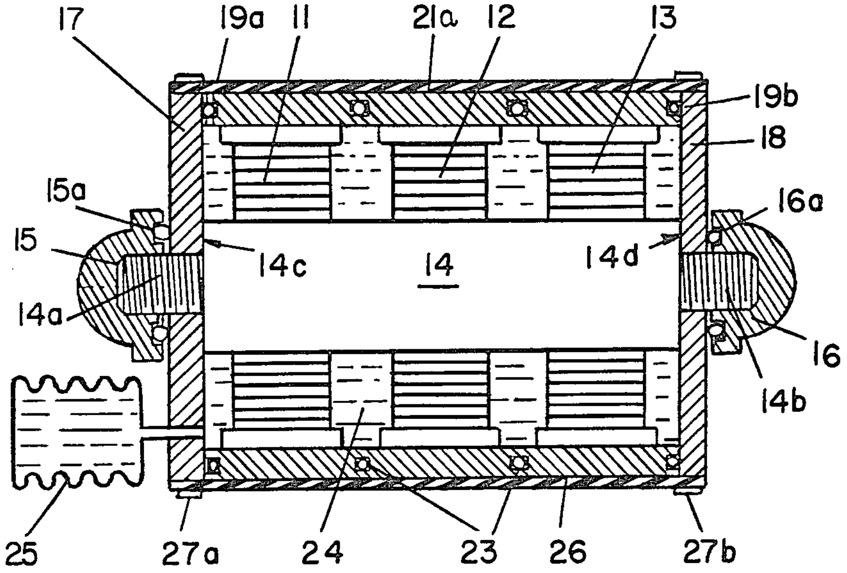
FIG. 3*a* is a longitudinal sectional view similar to that of FIG. 3 but showing a modified arrangement of a sonar antenna, constituted by piezoelectric transducers.

As a modification, the envelope of the several transducers can be made of a single piece that forms a hoop or band placed about the assembly of the piezoelectric drivers after the external face thereof has been precision machined this modification is shown in FIG. 3a, wherein all parts and the reference numerals are identified as in FIG. 3, except for the use of a substantially cylindrical envelope 21a, instead of the individual annular envelopes 20 through 22 of FIG. 3.

The antenna represented by FIG. 3 is meant to be immersed at a great depth. It is filled with a dielectric liquid 24, and the interior of the enclosure communicates with a deformable container 25 which can have the form of bellows or a similar pliable enclosure, immersed in water, so that the liquid 24 is in pressure equilibrium with the water, and the piezoelectric elements are subjected to a isotropic pressure.

An antenna according to FIG. 3 is omnidirectional if all the drivers are excited in phase.

Figure 4:
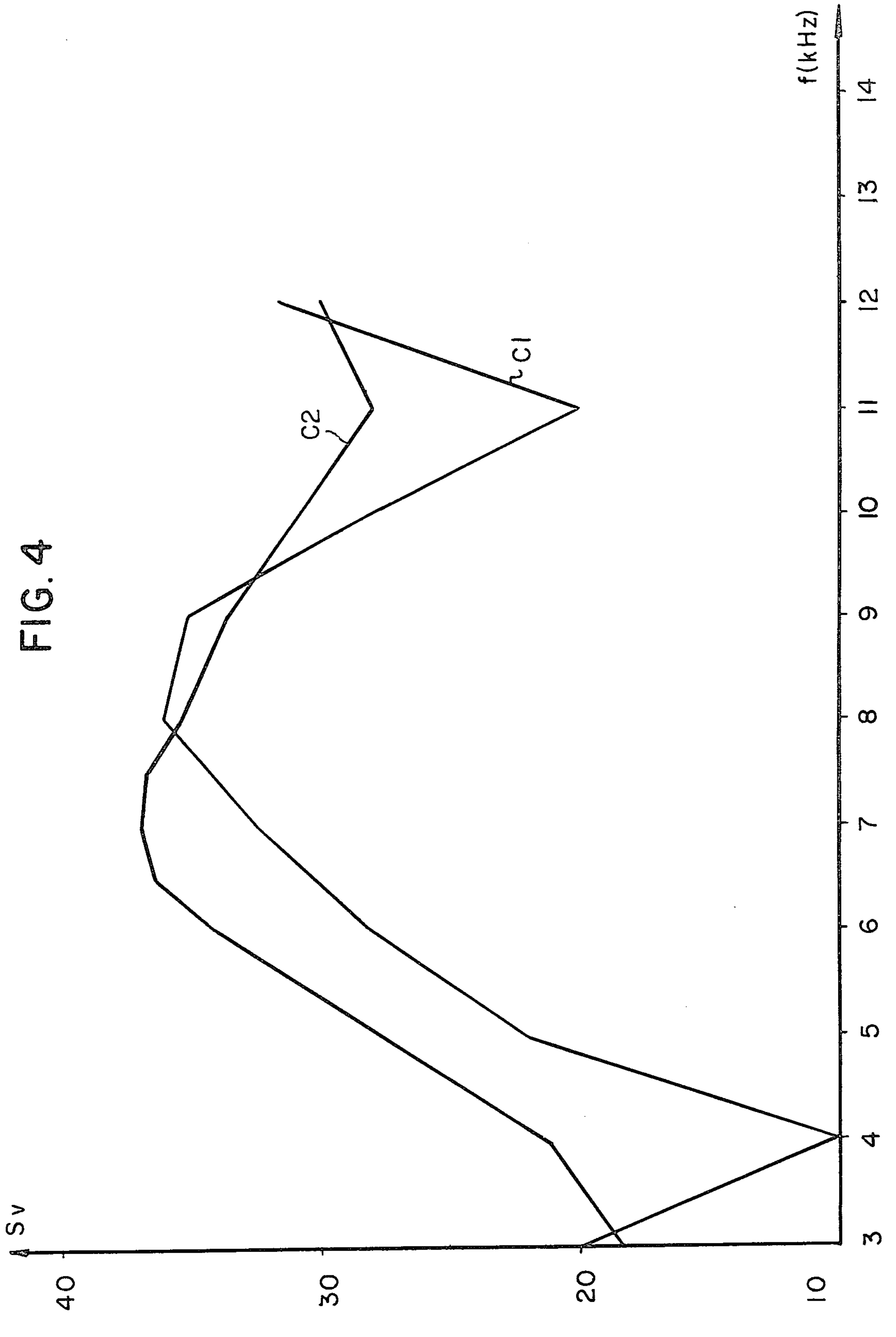
FIGS. 4 and 5 are comparative graphs of the voltage and power response of a transducer according to the present invention, compared to a known transducer.

FIG. 4 is a graph that represents comparative measurements of the response per volts Sv which represents, in decibels, variations as a function of the number of baryes emitted per one volt of excitation. The two curves have been obtained for two transducers which have a common envelope and identical piezoelectric drivers, both being of the type including drivers that are radially disposed in the envelope.

The curve C1 corresponds to a transducer of the known type in which each piezoelectric drive has its own counter-mass, which latter has no point of contact with the counter-masses of the adjacent drivers.

The curve C2 corresponds to a transducer according to the invention which has a central member that serves as the common counter-mass for all the drivers.

This graph shows that the resonant frequency is of the order of 7 kHz for the curve C2 while it is of the order of 8.5 kHz for the curve C1. Consequently one obtains a reduction of the resonant frequency of the order of 1.5 kHz. On the other hand, the pass-band is wider.

Figure 5:
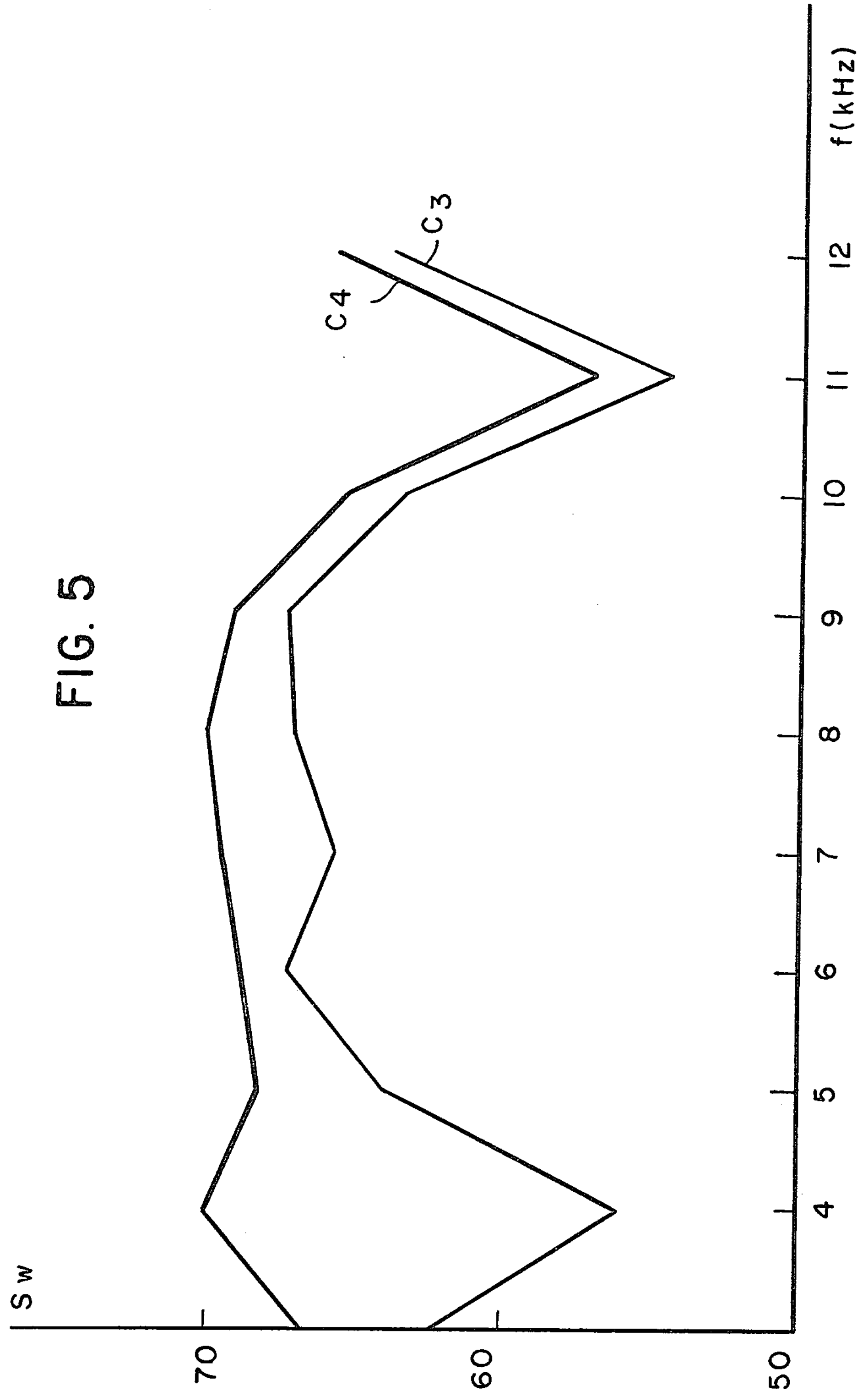

FIG. 5 is a graph that represents comparative measurements with the same two transducers, of the watt response Sw that represents, in decibels, variations according to the frequency of the number of baryes emitted for a power of one watt furnished in the form of electrical energy.

The curve C3 corresponds to a known transducer, with individual counter-masses, and the curve C4 to a transducer according to the invention, both having identical envelopes and drivers.

This graph shows that in the frequency band between 5 and 11 kHz one obtains an improvement of the response per watt Sw of 2 to 3 db, which is of the order of 30 to 50%. Above 5 kHz, the improvement is much more pronounced.

It is to be understood by those skilled in the art that various modifications and changes can be made without departing from the spirit and the scope of the invention.

What I claim is:

1. A piezoelectric transducer adapted to be immersed in water at great depths, comprising a substantially cylindrical envelope which is rigid in respect of its inner wall, a plurality of piezoelectric drivers disposed within said envelope, each driver being constituted by a stack of piezoelectric elements alternating with electrodes, said envelope being solid and constituting a tight hoop about said piezoelectric drivers, at least one pre-stressing rod for compressing each said stack, an intermediate member common to all of said drivers, to which member said drivers are each secured by said rod, said intermediate member also acting as a counter-mass for said drivers, end pieces for said drivers, said rods passing only through said end pieces and said drivers into said intermediate member, said envelope being non-perforate and being applied to said end pieces as said tight hoop to apply radial stresses thereto which additionally compress said stacks.

2. An assembly of a plurality of piezoelectric transducers as defined in claim 1 wherein said intermediate member is common to said plurality of transducers which are arranged in succession thereon.

3. An assembly of a plurality of piezoelectric transducers as defined in claim 1 wherein the cylindrical envelopes of the plurality of transducers are constituted as a common cylindrical element for all of said transducers.

4. The piezoelectric transducer as defined in claim 1, further comprising screw means for tightening said rods with respect to said end pieces.

5. The assembly as defined in claim 1, further comprising a pair of lateral covers, and wherein said intermediate member includes, threaded extremities to which screws are applied and, shoulders to abut said covers so that direct contact with said envelopes is avoided while they vibrate.

6. The assembly as defined in claim 5, further comprising acoustic uncoupling joints intercalated between said envelopes and said covers.

7. The assembly as defined in claim 6, further comprising water-tight means associated with said covers, and wherein said envelopes and said covers define a closed space that can be filled with a dielectric fluid in communication with a deformable receiver also immersed in the water so that the fluid is in pressure equilibrium with the surrounding water.

* * * * *